July 26, 1955 | E. A. GOLDBERG | 2,714,129

AMPLIFYING SYSTEMS

Filed April 14, 1953

INVENTOR.

Edwin A. Goldberg

BY [signature]

ATTORNEY 2,714,129

AMPLIFYING SYSTEMS

Edwin A. Goldberg, Princeton Junction, N. J., assignor to Radio Corporation of America, a corporation of Delaware Application April 14, 1953, Serial No. 348,764

4 Claims. (Cl. 178—5.4)

Figure 2:
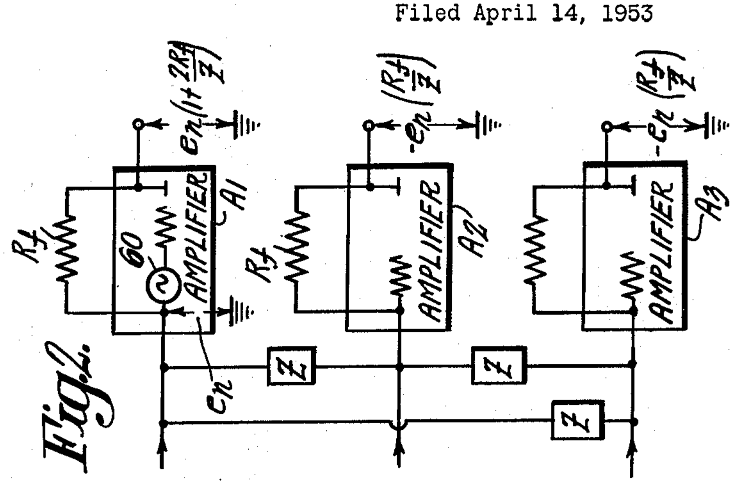

This invention relates to signal amplifying systems and more particularly to amplifying systems wherein it is desired to amplify in separate channels a plurality of independent signals, which may be derived from a common source, with a minimum of cross-talk between channels and with a high signal-to-noise ratio.

Systems of the amove mentioned character are of particular interest in the color television art, as where a single pickup tube is employed to simultaneously derive a plurality of component color image signals. A pickup tube of this type is described in U. S. Patent No. 2,446,249 issued on August 3, 1948, to Alfred C. Schroeder. In the tube described therein component color image signals are derived from a plurality of interleaved conducting signal strips, each acting as a signal plate for a respective strip portion of a scanned mosaic charged in accordance with a particular one of the component colors. As employed in a three-color television system, for example, signals representing respectively red, green and blue component colors are derived from three separate output leads respectively connected to spaced ones of the interleaved conducting strips.

A problem of maintaining signal separation often arises in a tube of the type employing interleaved signal strips, primarily due to the coupling capacity between each set of strips and the other two sets of strips, and secondarily due to leakage between strip sets. Unless some compensation is employed in the apparatus coupled to the output leads, crosstalk of an appreciable magnitude between the component color channels may ensue.

The present invention is directed toward signal utilization apparatus which provides for substantial elimination of such crosstalk while still providing a high signal-to-noise ratio. In accordance with an embodiment of the present invention, crosstalk between channels due to the interstrip capacity and leakage is substantially reduced by employing signal amplifying apparatus which presents a low input impedance to the signals appearing in the tube output leads. Rather than employing a small physical input impedance, the low input impedance is achieved dynamically by employing negative feedback in each signal channel.

The multifold advantage of this manner of eliminating color crosstalk resides in improvements in signal-to-noise ratio which would be lacking if one attempted to eliminate crosstalk merely by employing a physical impedance of low value in the input circuit of each signal channel.

One factor precluding the use of a low valued physical impedance in the input circuits is the existence of so-called Johnson noise, generated in a physical impedance due to thermal agitation in the resistive component thereof. Where, as in the present apparatus, input signal current is substantially independent of the value of the input impedance, an undesirable reduction of signal-to-noise ratio would accompany a decrease in the value of a physical input impedance, since the signal voltage developed across such an impedance will be directly proportional to the impedance value, whereas the mean square voltage due to Johnson noise therein is proportional to the square root of its resistance. This reduction in signal-to-noise ratio is avoided when the low input impedance value is effected dynamically.

Moreover, considering as well noise generated in the amplifying tube itself, the output of a feedback amplifier, which provides dynamically a given value of input impedance, will in accordance with well known principles of feedback in amplifiers have a greater signal-to-noise ratio than a corresponding non-feedback amplifier with an input impedance of the same value, the improvement factor being roughly equivalent to the gain of the amplifying tube.

However, an additional significant contribution of the present invention to the achievement of a high signal-to-noise ratio in the overall system resides in the fact that, due to the use of feedback in each channel, a substantial portion of the noise generated in the amplifying apparatus associated with any one channel appears in opposite phase in the other component color channels. As a result, in the subsequent reproduction of images from the component color signals the effect of this noise in producing spurious colors is substantially eliminated.

Accordingly it is a primary object of the present invention to provide a system for amplifying in separate channels a plurality of independent signals derived from a common source with a minimum of crosstalk between channels and with a high signal-to-noise ratio.

It is a further object of the present invention to provide means for substantially eliminating color crosstalk ing a color pickup tube of the type employing a plurality of interleaved signal strips.

It is another object of the present invention to provide a camera preamplifier for a color pickup tube wherein color crosstalk is substantially lessened and a high signal-to-noise ratio is obtained.

An additional object of the present invention is to provide a novel and improved preamplifier for a tri-color camera tube in a color television system of the simultaneous type.

Figure 1:
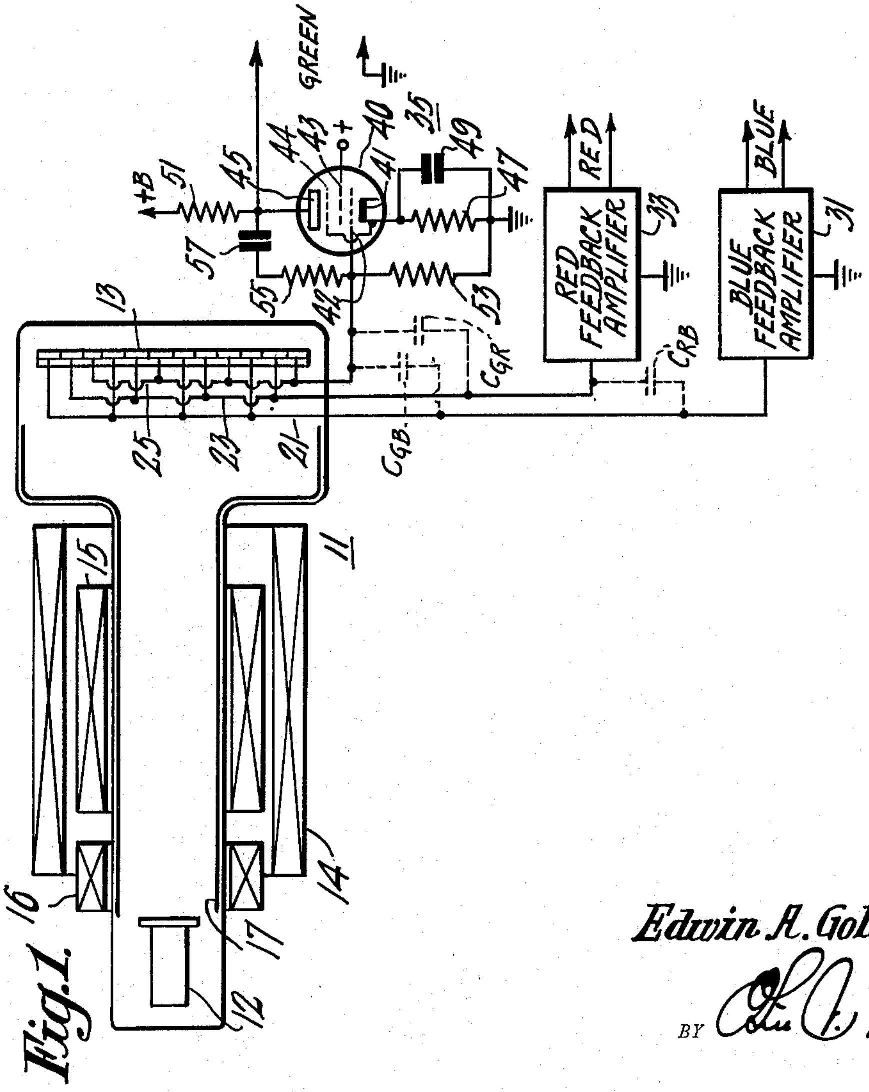

Other objects and advantages of the present invention will become apparent to those skilled in the art upon a reading of the following detailed description and an inspection of the accompanying drawings in which:

Figure 1 illustrates in block and schematic form a pickup tube system incorporating a preamplifier in accordance with the present invention; and Figure 2 illustrates diagrammatically an explanation of a noise reduction feature of the present invention.

Referring to Figure 1 in greater detail, a color pickup tube system employing a single camera tube is shown. As explained previously the invention is particularly applicable to use with color pickup tubes of the type employing a plurality of interleaved signal strips. The tube described in the aforementioned Schroeder patent was referred to as an example of a tube of this type. However, for purposes of further exemplification, the invention will be described in relation to a pickup tube of the photoconductive type, such as that described in the copending application of Paul K. Weimer, Serial No. 344,497, filed March 25, 1953, and entitled "Cathode Ray Tube and Target." An embodiment of the tube disclosed therein includes a target comprising a glass base; a plurality of red, green and blue filter strips deposited thereon and interleaved in a predetermined sequence; a plurality of optically transparent, electrically conductive strips laid down on the filter strips such that a given conductive strip is superimposed upon a given one of the said filter strips; a continuous layer of photoconductive material, such as porous antimony sulphide, deposited over the conductive strips, and respective "red," "blue"

and "green" bus bars connected to the appropriate ones of said conductive strips. As such a target is scanned by a cathode ray beam, each bus bar is supplied its component color signal from the signal strips associated therewith in response to the discharge of those portions of the target which received image-representative charges as light of the respective component color passed through the optical filter strips associated therewith.

In Figure 1 a pickup tube 11 of this type is illustrated schematically. The tube is provided with a conventional electron gun 12 which may include the usual cathode, control electrode and one or more accelerating electrodes which are connected to operating potentials in a well known manner. A target of the above mentioned character is illustrated as target 13 at the opposite end of the tube 11. Means are provided for focusing the electron beam developed by electron gun 12, and for scanning the beam over target 13 to develop a conventional scanning raster. These means may include focusing coil 14 and deflection yoke 15; an alignment coil 16 may additionally be provided. An electrode (not shown) permeable to the electron beam may be positioned adjacent to the target 13 and utilized together with focus coil 14 to ensure that the beam in its final approach to the surface of target 13 is normal thereto. A final accelerating electrode 17 may be in the form of a conducting coating on the interior of the envelope of the tube 11. While the target 13 has not been illustrated in full detail, it will be appreciated from the description above that the output leads 21, 23 and 25, which may take the form of bus bars incorporated in the target structure, are supplied with the respective blue, red and green component color signals derived from appropriate ones of the conductive strips in the target structure 13. As illustrated, the respective output leads 21, 23 and 25 are coupled to separate color channels which includes respectively a "blue" feedback amplifier 31, a "red" feedback amplifier 33 and a "green" feedback amplifier 35. Since, the three amplifiers may be substantially identical, only the circuit details of the green amplifier 35 have been shown, while the blue and red amplifiers 31 and 33 have been shown in block form.

The green amplifier 35 includes an amplifying stage incorporating an electron discharge device 40 (desirably having a high $g_m$), which may, for example, be a pentode having a cathode 41, control grid 42, screen grid 43, suppressor grid 44, and a plate 45. The cathode 41 is connected to a point of reference potential (i. e. ground in the illustrated embodiment) via a cathode resistor 47 shunted by by-pass capacitor 49. Plate 45 is connected to a source of anode potential (not illustrated) via the plate resistor 51. A grid leak resistor 53 is connected between grid 42 and ground. The suppressor grid 44 may be tied to the cathode 41, and the screen grid 43 connected to a suitable source of screen grid potential (not shown).

A feedback path between the output and input of the amplifying stage includes a feedback resistor 55 and a blocking capacitor 57 connected in series between the plate 45 and grid 42. Preferably, plate resistor 51 and grid leak resistor 53 are both large relative to feedback resistor 55, so that the effective input impedance for the amplifying stage is roughly equal to $1/g_m$. The green output signal appearing between plate 45 and ground may be applied to subsequent signal utilization apparatus in the green channel, which may, for example, include subsequent signal amplifying stages. It may be assumed that the red amplifier 33 and the blue amplifier 31 are substantially identical with the detailed showing of the green amplifier 35.

An explanation of the operation of the present invention necessitates a preliminary analysis of the difficulties which are presented when using a tube of this type. Due to the nature of the signal deriving means for each channel, which as noted comprises a plurality of spaced signal strips which are interleaved with the signal strips for the other channels, there is a significantly high coupling capacity between each set of conducting strips and the other two sets of conducting strips. These inherent capacities have been illustrated in dotted lines as capacitors $C_{gb}$, $C_{gr}$ and $C_{rb}$. In a typical tube of the type disclosed in the aforementioned Weimer application, the coupling capacity from one set of strips to the other two sets of strips may be of the order of 1000 $\mu\mu$f. Of secondary importance with respect to the causation of color crosstalk is the existence of leakage between the sets of signal strips. In a typical tube of the type described, the leakage resistances may be of the order of 50,000 ohms. In the description to follow, the use of the term inter-strip coupling impedances may be considered as including the resistive leakage component in shunt with the coupling capacity between strip sets.

If camera preamplifiers of the type conventionally employed in monochrome pickup tube systems were coupled to the output leads of tube 11, the input impedance of each such amplifier would be so high relative to the inter-strip coupling impedances that a considerable portion of each component color signal would appear in the other color channels. This color crosstalk would render the separation of component color signals at the target substantially ineffective. To reduce this color crosstalk to a permissible value, the preamplifiers coupled to the tube's output leads should have significantly low input impedances compared with the inter-strip coupling impedances.

However, if an actual or physical impedance of low value is employed in each preamplifier's input circuit to establish the low input impedance thus required, the signal-to-noise ratio for the preamplifiers would be at a relatively unsatisfactory level. One factor which would contribute to the unreasonably low value of signal-to-noise ratio, would be the increased ratio of Johnson noise voltage to input signal voltage in each input circuit, as previously discussed. A further factor in the diminution of signal-to-noise ratio resides in the fact that the available input signal voltage is reduced while the output noise voltage due to noise generated within the amplifying tube remains unchanged.

Thus, to provide the preamplifier with the low input impedance requisite for adequate color separation while still maintaining a satisfactory signal-to-noise ratio, the present invention employs negative feedback from the output electrode of the amplifying stage to its input electrode so as to effect a low input impedance dynamically. By introducing the low input impedance in this manner the aforementioned objectionable increase in Johnson noise ratio is avoided, and advantage is taken of the improvement in signal-to-noise ratio of a feedback amplifier over a non-feedback amplifier having an equivalent value of input impedance.

However, an additional contribution to improvement of the signal-to-noise ratio of the overall system is provided by virtue of the use of negative feedback in each of the channels. This additional contribution to a high signal-to-noise ratio resides in the fact that amplifier noise which may be generated in one channel (e. g. in the green amplifying tube 35), and which appears in the output thereof with a given polarity, appears also in the output of the other channels but with opposite polarity. As a result, a significant portion of such noise may effectively cancel itself out in a subsequent color reproduction of the scanned image.

To aid in the explanation of this highly desirable noise reduction feature of the present invention, Figure 2 shall now be considered in which three feedback amplifiers $A_1$, $A_2$ and $A_3$ having cross-coupled input leads have been partially illustrated. These amplifiers may each take the detailed form of amplifier 35 in Figure 1 but for the purpose of the noise analysis are shown in block and partial schematic form.

A major portion of the noise generated in an amplifying stage such as amplifier 35 will be noise produced in the plate current circuit of the amplifying tube. Such noise may, for example, include so-called "shot" noise due to the well known Schottky effect. By virtue of the feedback path between output and input electrodes a value of noise voltage due to this noise produced in the plate current circuit will appear at the input electrode of the amplifying tube. Thus, in Figure 2 for the purposes of analysis a noise generator 60 has been shown in series with the input electrode of the amplifier $A_1$, producing a noise voltage $e_n$ between the input electrode and a point of reference potential (shown as ground). Although this assumed noise generator is shown in series with the input electrode it will be appreciated that it is representative of noise generation which takes place mainly in the plate current circuit of the amplifier $A_1$ and appears at the input electrode due to the feedback through the feedback resistor $R_f$.

The input electrodes of the three amplifiers are cross-coupled through impedances of equal value Z. To simplify the analysis it will be assumed that the input impedances between the input electrodes of amplifiers $A_2$ and $A_3$ and ground are quite small relative to the value of each impedance Z. Thus it may be assumed that the noise voltage $e_n$ effectively appears across a pair of impedances Z in parallel, or an impedance having a value equal to $$\frac{Z}{2}$$

Thus the noise current flow through the feedback resistor $R_f$ of amplifier $A_1$ will be substantially equal to $$\frac{e_n}{Z/2}, \text{ or } \frac{2e_n}{Z}$$

The noise output voltage appearing at the output electrode of amplifier $A_1$ will be equal to the voltage drop across $R_f$ due to this noise current plus the voltage between $A_1$'s input electrode and ground (i. e. $e_n$). This noise output voltage is therefore equal to $$e_n+\frac{2e_nR_f}{Z}, \text{ or } e_n\left(1+2\frac{R_f}{Z}\right)$$

The noise currents through the impedances Z to the input electrodes of amplifiers $A_2$ and $A_3$ will, under the assumption above, each have a value equal to $$\frac{e_n}{Z}$$

These noise currents flowing through the respective feedback resistors $R_f$ of the amplifiers $A_2$ and $A_3$ will thus each produce a noise output voltage at the output electrodes of these amplifiers which is substantially equal to the voltage drop across resistor $R_f$, or $$\frac{e_nR_f}{Z}$$

These voltages will be of opposite polarity to that produced in the output of amplifier $A_1$, since the theoretical noise current flow through the feedback resistors of amplifiers $A_2$ and $A_3$ is in the opposite direction to the assumed noise current flow through the feedback resistor $R_f$ of amplifier $A_1$.

Thus it may be seen that noise generated in amplifier $A_1$ produces a noise output voltage for the channel associated therewith of a value equal to $$e_n\left(1+2\frac{R_f}{Z}\right)$$

and produces noise output voltages for the channels associated with amplifiers $A_2$ and $A_3$, each of a value equal to minus $$\frac{e_nR_f}{Z}$$

A substantial portion of the noise appearing in the channel associated with amplifier $A_1$ is therefore counterbalanced by the appearance of an equal amount of noise of the opposite polarity in the other two channels. It will be appreciated that this portion of the noise which is counterbalanced may comprise a major proportion of the noise generated by amplifier $A_1$, particularly over a frequency range wherein $R_f$ is substantially greater than the value of the coupling impedances Z. While the above explanation has only concerned itself with noise generated in amplifier $A_1$ it will be appreciated that the analysis can be similarly extended to the noise generated in the amplifiers $A_2$ and $A_3$.

Thus, returning to Figure 1, a major portion of the amplifier noise generated in any of the feedback amplifiers 31, 33 and 35 will be effectively counterbalanced in any subsequent color image reproduction operation by the appearance of an equivalent amount of noise of the opposite polarity in the other two color channels.

While in the foregoing description, application of the present invention to a tri-color television system involving three component color signal channels has been presented, it will be appreciated that the invention is similarly applicable to other types of television systems wherein the number of component color signal channels may be greater or less than three.

What is claimed is:

1. In a color television system, apparatus comprising the combination of a camera tube having a plurality of related means for deriving respective component color signals from a common current source, said common current source comprising a scanning cathode ray beam, and each of said related deriving means including a set of mutually connected signal strips interleaved with the signal strips of the other signal deriving means, a plurality of signal amplifiers, each of said signal amplifiers being coupled to a respective one of said signal deriving means, and means for establishing a negative feedback path in each of said signal amplifiers so as to reduce the effective input impedance of each of said signal amplifiers to a relatively low value.

2. In a color television system, a tri-color camera tube including three sets of interleaved signal strips for developing three respective component color signals, a coupling impedance existing between each set of signal strips and the other sets, three component color signal channels, each of said signal channels including an amplifying stage having an input and an output circuit, means for coupling the input circuit of each of said signal amplifying stages to a respectively different one of said sets of signal strips, means for establishing a negative feedback path between the output circuit and input circuit of each of said amplifying stages so that noise generated in any one of said amplifying stages and appearing in the output thereof may be coupled through said feedback paths and said coupling impedances to the input circuits of the other amplifying stages and appear in the outputs thereof in opposite polarity.

3. In a television system, apparatus comprising the combination of a cathode ray tube including a plurality of sets of signal strips for providing respective component image signals, said signal strip sets being mutually coupled by inherent impedances of a given order of magnitude, a plurality of signal amplifying means, each of said signal amplifying means being coupled to a respective one of said signal strip sets, means for dynamically reducing the effective input impedance of each of said signal amplifying means to a lower order of magnitude than said given order of magnitude, said dynamic input impedance reducing means comprising means for establishing a negative feedback loop in each of said signal amplifying means.

4. In a color television system, apparatus comprising the combination of a color television pickup tube including a plurality of sets of signal strips for providing respective component color signals, cross-coupling impedances existing between said signal strip sets, a plurality of signal amplifiers respectively coupled to different ones of said signal strip sets, means for dynamically establishing an effective input impedance for each of said signal amplifiers which is of a substantially lower magnitude than the magnitude of said cross-coupling impedances, said latter means comprising a negative feedback path in each of said signal amplifiers.

References Cited in the file of this patent

UNITED STATES PATENTS

| | | |
|---|---|---|
| 2,615,976 | Rose | Oct. 28, 1952 |
| 2,627,547 | Bedford | Feb. 3, 1953 |